(12) United States Patent
Hoerpel et al.

(10) Patent No.: US 8,163,441 B2
(45) Date of Patent: *Apr. 24, 2012

(54) INORGANIC SEPARATOR-ELECTRODE-UNIT FOR LITHIUM-ION BATTERIES, METHOD FOR THE PRODUCTION THEREOF AND USE THEREOF IN LITHIUM BATTERIES

(75) Inventors: Gerhard Hoerpel, Nottuln (DE); Volker Hennige, Duelmen (DE); Christian Hying, Rhede (DE); Sven Augustin, Ober-Ramstadt (DE)

(73) Assignee: Evonik Degussa GmbH, Essen (DE)

( * ) Notice: Subject to any disclaimer, the term of this patent is extended or adjusted under 35 U.S.C. 154(b) by 277 days.

This patent is subject to a terminal disclaimer.

(21) Appl. No.: 12/559,519

(22) Filed: Sep. 15, 2009

(65) Prior Publication Data

US 2010/0000079 A1   Jan. 7, 2010

Related U.S. Application Data

(62) Division of application No. 11/577,542, filed as application No. PCT/EP2004/052605 on Oct. 21, 2004, now Pat. No. 7,829,242.

(51) Int. Cl.
*H01M 4/50* (2010.01)
*H01M 2/16* (2006.01)
*H01M 10/50* (2006.01)
*B05D 5/12* (2006.01)

(52) U.S. Cl. ........ 429/523; 429/517; 429/518; 429/519; 429/522; 429/529; 427/162.3; 427/126.6

(58) Field of Classification Search ............... 429/218.1, 429/221, 223, 224, 231, 231.5, 231.8, 232; 427/162.3, 126.6
See application file for complete search history.

(56) References Cited

U.S. PATENT DOCUMENTS

| | | | |
|---|---|---|---|
| 5,582,935 A * | 12/1996 | Dasgupta et al. .......... 429/218.1 |
| 5,691,077 A | 11/1997 | Yu | |
| 6,096,173 A | 8/2000 | Von Hippel et al. | |
| 6,287,720 B1 * | 9/2001 | Yamashita et al. ............. 429/131 |
| 6,291,102 B1 * | 9/2001 | Yoshida et al. .......... 429/231.95 |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,447,958 B1 | 9/2002 | Shinohara et al. | |
| 6,458,750 B1 | 10/2002 | Dardin et al. | |
| 6,475,677 B1 | 11/2002 | Inda et al. | |
| 6,620,320 B1 | 9/2003 | Hying et al. | |
| 6,841,075 B2 | 1/2005 | Penth et al. | |
| 7,235,298 B2 | 6/2007 | Katusic et al. | |
| 7,288,501 B2 | 10/2007 | Auer et al. | |
| 7,374,743 B2 | 5/2008 | Katusic et al. | |
| 7,525,788 B2 | 4/2009 | Hoerpel et al. | |
| 2001/0036437 A1 | 11/2001 | Gutsch et al. | |
| 2001/0038942 A1 | 11/2001 | Fisher et al. | |
| 2001/0055639 A1 | 12/2001 | Moritz et al. | |
| 2002/0023419 A1 | 2/2002 | Penth et al. | |
| 2002/0039648 A1 | 4/2002 | Horpel et al. | |
| 2003/0206854 A1 | 11/2003 | Gutsch et al. | |
| 2004/0028913 A1 | 2/2004 | Hennige et al. | |
| 2004/0038105 A1 | 2/2004 | Hennige et al. | |
| 2004/0262169 A1 | 12/2004 | Hying et al. | |
| 2005/0031942 A1 | 2/2005 | Hennige et al. | |
| 2005/0070193 A1 | 3/2005 | Hennige et al. | |
| 2005/0084761 A1 | 4/2005 | Hennige et al. | |
| 2005/0087491 A1 | 4/2005 | Hennige et al. | |
| 2005/0221165 A1 | 10/2005 | Hennige et al. | |
| 2005/0221192 A1 | 10/2005 | Hennige et al. | |
| 2005/0255769 A1 | 11/2005 | Hennige et al. | |
| 2006/0024569 A1 | 2/2006 | Hennige et al. | |
| 2006/0046138 A1 | 3/2006 | Hennige et al. | |
| 2006/0078791 A1 | 4/2006 | Hennige et al. | |
| 2006/0166085 A1 | 7/2006 | Hennige et al. | |
| 2007/0099072 A1 | 5/2007 | Hennige et al. | |
| 2007/0175362 A1 | 8/2007 | Gutsch et al. | |
| 2007/0184993 A1 | 8/2007 | Scherer et al. | |
| 2007/0213237 A1 | 9/2007 | Scherer et al. | |
| 2007/0219101 A1 | 9/2007 | Scherer et al. | |
| 2007/0254178 A1 | 11/2007 | Nun | |
| 2008/0020190 A1 | 1/2008 | Nun et al. | |
| 2008/0032197 A1 | 2/2008 | Horpel et al. | |

(Continued)

FOREIGN PATENT DOCUMENTS

DE    0 892 448    1/1999

(Continued)

OTHER PUBLICATIONS

U.S. Appl. No. 60/021,600, filed Jul. 11, 1996, Riemenschneider, et al.

(Continued)

*Primary Examiner* — Melvin Mayes
*Assistant Examiner* — Jun Li
(74) *Attorney, Agent, or Firm* — Oblon, Spivak, McClelland, Maier & Neustadt, L.L.P.

(57) ABSTRACT

Separator-electrode assemblies (SEAs) comprise a porous electrode useful as a positive or negative electrode, in a lithium battery and a separator layer applied to this electrode, the separator layer being an inorganic separator layer comprising at least two fractions of metal oxide particles different from each other in their average particle size and/or in the metal, and the electrode having active mass particles are bonded together and to the current collector by inorganic adhesive; and a process for their production.

14 Claims, No Drawings

U.S. PATENT DOCUMENTS

| | | | |
|---|---|---|---|
| 2008/0084686 A1 | 4/2008 | Gutsch et al. |
| 2008/0138700 A1 | 6/2008 | Horpel et al. |
| 2008/0245735 A1 | 10/2008 | Hennige et al. |
| 2008/0280050 A1 | 11/2008 | Nun et al. |
| 2008/0283171 A1 | 11/2008 | Nun et al. |
| 2008/0305702 A1 | 12/2008 | Nun et al. |
| 2009/0078485 A1 | 3/2009 | Gutsch et al. |
| 2010/0003401 A1 | 1/2010 | Horpel et al. |

FOREIGN PATENT DOCUMENTS

| | | |
|---|---|---|
| DE | 199 18 856 | 11/1999 |
| DE | 102 38 943 | 3/2004 |
| EP | 0 967 671 | 12/1999 |
| EP | 1 049 188 | 11/2000 |
| JP | 62-281263 | 12/1987 |
| KR | 2004096203 * | 11/2004 |
| WO | 99/15262 | 4/1999 |
| WO | 99/62620 | 12/1999 |
| WO | 99/62624 | 12/1999 |
| WO | 01/89022 | 11/2001 |
| WO | 01/91219 | 11/2001 |
| WO | 03/021697 A2 | 3/2003 |
| WO | 2004/021475 A1 | 3/2004 |
| WO | 2004/049471 A2 | 6/2004 |

OTHER PUBLICATIONS

U.S. Appl. No. 08/842,775, filed Apr. 17, 1997, Riemenschneider, et al.

U.S. Appl. No. 09/441,439, filed Nov. 17, 1999, Barthold, et al.

U.S. Appl. No. 60/194,367, filed Apr. 4, 2002, Michael, et al.

U.S. Appl. No. 12/746,683, filed Jun. 7, 2010, Hedrich, et al.

D. Knittel, et al., "Untersuchungen Zur Permanenten Oleophobausruestung-Reaktive Fluorierte Verbindungen", Textilveredlung, pp. 362-363 (1998).

E.W. Washburn, "Note on a Method of Determining the Distribution of Pore Sizes in a Porous Material", Physics, vol. 7 (1921).

* cited by examiner

INORGANIC SEPARATOR-ELECTRODE-UNIT FOR LITHIUM-ION BATTERIES, METHOD FOR THE PRODUCTION THEREOF AND USE THEREOF IN LITHIUM BATTERIES

This is a divisional application of U.S. application Ser. No. 11/577,542, now U.S. Pat. No. 7,829,242 filed Jun. 1, 2007, which is a 371 of PCT/EP04/52605 filed on Oct. 21, 2004.

This invention relates to a separator-electrode assembly for lithium ion batteries, a process for production thereof and also their use.

An electrical separator is a separator used in batteries and other systems in which electrodes have to be separated from each other while maintaining ion conductivity for example.

The separator is customarily a thin porous insulating material possessing high ion permeability, good mechanical strength and long-term stability to the chemicals and solvents used in the system, for example in the electrolyte of the battery. In batteries, the separator should fully electronically insulate the cathode from the anode, but be pervious to the electrolyte. Moreover, the separator has to be permanently elastic and follow movements in the system, for example in the electrode pack in the course of charging and discharging.

The separator is a crucial determinant of the use life of the system in which it is used, for example the use life of battery cells. The development of rechargeable batteries is therefore marked by the development of suitable separator materials.

General information about electrical separators and batteries may be found for example in J. O. Besenhard in "Handbook of Battery Materials" (VCH-Verlag, Weinheim 1999).

Separators in use at present consist predominantly of porous organic polymeric films (eg EP 0 892 448, EP 0 967 671) or of inorganic nonwovens, for example nonwovens composed of glass or ceramic materials or else ceramic papers. These are produced by various companies. Important producers include Celgard, Tonen, Ube, Asahi, Binzer, Mitsubishi, Daramic and others. A typical organic separator consists for example of polypropylene or of a polypropylene/polyethylene/poly-propylene composite.

Lithium secondary batteries are today generally produced by electrodes and separators having been fabricated separately and only combined by the battery manufacturer. This can be accomplished for example by laminating at elevated pressure and temperature. It would be simpler to apply the separator directly to one of the two electrodes. The positive electrode (cathode) usually consists of a porous lithium compound, for example $LiCoO_2$ or $LiMnO_2$, bound into, or bonded together by, a heat-resistant polymer matrix, for example poly-vinylidene fluoride. The negative electrode (anode) frequently consists of graphite which is likewise adhered to a polymer. The direct application of thin, porous layers or films to conventional separator materials, such as PP and PE, is very difficult.

Today it is therefore customary for electrode and separator to be joined together by laminating. For this to work, the separators used comprise a relatively heat-resistant polymer. In EP 1 049 188, for example, a separator is produced by forming a lithium-glass-ceramic powder which is suspended in a solution of polyvinylidene fluoride (PVDF) and hexafluoropropylene in acetone and subsequently forming a film from this suspension. The separator thus produced is laminated onto the positive electrode. Similarly, the separator described in DE 199 18 856 is produced on its own and is subsequently laminated onto the positive electrode. The separator described in DE 199 18 856 is likewise obtained by forming a film from a suspension, in this case a solution of a nitrogen-containing aromatic polymer (as a very heat-resistant polymer) and ceramic powder.

The prior art further discloses the direct coating of the negative electrode (graphite) with a porous polymeric layer (WO 01/91219, WO 01/89022), which may include ceramic particles such as $TiO_2$, $SiO_2$ or $Al_2O_3$ as a filler. Direct coatings of electrodes, neither anode nor cathode, with pure ceramics are not known from the prior art.

Ceramic separators for lithium ion batteries are likewise virtually unknown. WO 99/15262 describes a composite material formed by suspensions of ceramic particles being applied onto and into a porous support and solidified therein. This composite material is likewise said to be useful as a separator. There is no description of a direct production of separator-electrode assemblies in WO 99/15262. In addition, investigations have shown that the materials and technique described therein do not allow the production of separator-electrode assemblies.

DE 102 38 943 provides that applying a suspension of metal oxide particles selected from $Al_2O_3$ and $ZrO_2$ having a particle size which is preferably greater than the pore size of the electrode to be coated, in a sol, and subsequent solidification into a porous inorganic layer on the electrode can be used to coat the electrode with a thin separator which after impregnation with an electrolyte solution or an electrolyte gel possesses excellent ion conductivity and also exhibits the highest possible meltdown safety. Such a separator-electrode assembly may further possess a flexibility which corresponds to that of the positive or negative electrode used.

But there is still a disadvantage with this technology in that the separator-electrode assembly (SEA) can only be dried and consolidated below the melting, softening or decomposition temperature of the organic polymer used to produce the electrode. At a higher thermal stability it would be desirable to solve various disadvantages. For instance, the low thermal stability means that drying is only possible at low temperatures, which entails correspondingly long, costly and inconvenient drying procedures to produce the SEA and the battery fabricated therefrom (before filling with an electrolyte).

The battery fabricated using a prior art separator-electrode assembly contains polymeric binders binding the electrode materials to each or one another and to the electrode. The applicant has now found that these polymers block a portion of the electrode material surface, so that there is no completely unhindered ion transport and ion entry into the active masses. Some binder materials, moreover, are decomposable at high temperatures, so that undesirable partial exothermic decomposition reactions involving the polymeric binders can occur in the battery itself in the event of a malfunction thereof.

It is an object of the present invention to provide an inorganic separator-electrode assembly (i-SEA) which contains no organic polymer binders whatsoever and which is stable at higher temperatures.

It was found that, surprisingly, it is possible to produce separator-electrode assemblies (SEAs) whose electrode includes no organic materials whatsoever when the active masses of the electrodes, for example $LiCoO_2$; $LiMnO_2$; $LiNiO_2$; $LiFe(PO_4)$ and others, are firmly applied to the current collector and electrically connected using inorganic adhesives and not polymeric binders.

The present invention accordingly provides separator-electrode assemblies comprising a porous electrode useful as an electrode in a lithium battery and a separator layer applied to this electrode, characterized in that the separator-electrode assembly has an inorganic separator layer comprising at least two fractions of metal oxide particles different from each other in their average particle size and/or in the metal, and an electrode whose active mass particles are bonded together and to the current collector by inorganic, electroconductive adhesive.

The present invention further provides a process for producing a separator-electrode assembly, characterized in that it comprises forming a porous electrode useful as a positive (cathode) or negative (anode) electrode in a lithium battery by applying a suspension comprising active mass particles suspended in a sol or a dispersion of nanoscale active mass particles in a solvent and solidifying the suspension to form an all-inorganic porous electrode layer on a current collector by at least one thermal treatment, and in that a porous inorganic coating separator layer is formed on the electrode substrate thus produced by applying a suspension comprising metal oxide particles in a sol and solidifying the inorganic separator layer on the electrode by at least one thermal treatment, and also separator-electrode assemblies produced according to the process of the present invention.

The present invention also provides for the use of a present invention separator-electrode assembly in lithium batteries and also lithium batteries comprising a present invention separator-electrode assembly.

The inorganic separator-electrode assembly of the present invention has the advantage that in it the entire surface of the electrode materials is accessible. The thermal stability is merely determined by the thermal stability of the active mass. This is strongly dependent on the charge state of the battery. For details concerning this topic reference is made to the literature (J. O. Besenhard, "Handbook of Battery Materials" (VCH-Verlag, Weinheim 1999)). Typically, the i-SEA of the present invention is stable at temperatures above 200° C. up to 700° C., depending on the stability of the particular active mass used.

The oxides of cobalt and/or of manganese and/or of titanium which are preferably used as inorganic adhesives and the use of nanoscale active mass particles provides very good electroconductive connections between the large active mass particles. These materials can also intercalate lithium ions, which is why the adhesive can act as an active mass as well as forming an adhesive function, and thus the storage capacity is improved compared with conventional SEAs since no inert material, i.e., material which is incapable of accomodating lithium ions or which is non-conductive, is present in the electrode. In addition, the surface of the active mass particles is not blocked since the adhesive itself is lithium ion conducting and thus the lithium can migrate through the adhesive bond.

The i-SEAs of the present invention also have the advantage of being very simple to produce and that distinctly higher temperatures can be employed in their production than in the production of conventional separator-electrode assemblies, since the electrode is completely void of heat-sensitive organic materials.

The method of production also ensures that the separator is very firmly bonded to the electrode. The separator layer used is not the porous polymer, but a porous ceramic layer. This ceramic layer is applied to the electrode via a suspension (slip) and solidified there. This makes it possible to apply very thin separator layers which have only very low resistance after infiltration with the electrolyte. This separator-electrode assembly is thus particularly suitable for use in high power and high energy batteries. The separator-electrode assembly according to the present invention also possesses very good mechanical stability and is in particular flexible. The use of a porous ceramic separator layer virtually excludes the possibility of whisker growth in or through the separator. In addition, the ceramic layer constitutes very good protection against a mechanical shortcircuit of the two electrodes, such as a free-standing separator can never be. The inorganic, ceramic separator layer also makes it impossible for a meltdown of the battery or separator to occur. The herein described separator layer in the separator-electrode assemblies is thus much safer than any polymeric separators, but also safer than a ceramic separator based on a polymeric nonwoven support.

Safety plays a very important part in lithium batteries. In contrast to other types of battery (Pb, NiCd, NiMeH), the solvent used for the electrolyte is not water but a flammable solvent, for example ethylene carbonate (EC), propylene carbonate (PC), dimethyl carbonate (DMC), since water would decompose at the high potentials in the lithium cell. For this reason, the separator can and must make a decisive contribution to the safety of a high energy battery. In the event of overheating and destruction of the cell, lithium batteries can thus give rise to a fire or an explosion.

When the cell overheats, a possible particular consequence is the release of oxygen from the positive masses, for example LiCoO, LiMnO or LiNiO, by decomposition. When organic binder and/or an organic separator is present, the released oxygen may react with these organic materials and the actual thermal runaway may take place as a result. In the case of the i-SEAs of the present invention, such a reaction is prevented through the avoidance of organic materials suitable for reaction.

Under the heading of safety, a fundamental distinction must be drawn between two aspects:
1 Heating due to cell malfunction,
2 External heating.

The former case can arise, for example, when an internal shortcircuit occurs in the operation of the battery. The battery can then very rapidly self-discharge in a hazardous reaction. This will produce such Large electric currents that a closed battery cell can in the least favorable case even explode.

Polymeric separators provide for example the safety performance demanded at present of lithium batteries by impeding any ionic transport between the electrodes beyond a shutdown temperature, which is about 120° C. This is because, at this temperature, the pore structure of the separator collapses and all the pores close up. As a result of ionic transport being stopped, the hazardous reaction which can lead to an explosion ceases.

In the second case, however, if the cell is further heated owing to external circumstances, the meltdown temperature will be exceeded at about 150° C. At this temperature, the separator, which customarily is composed of PP, after all, will start to melt and contract. The two electrodes then come into direct contact at many locations in the battery cell and so there will be internal shortcircuiting over a large area. This leads to an uncontrolled reaction which ends with the cell exploding, or the resultant pressure is released by an overpressure valve (a bursting disk) frequently with signs of fire.

The separator-electrode assembly of the present invention, which comprises an inorganic separator layer, can never give rise to a meltdown, since the heat-resistant inorganic particles will ensure that the separator does not melt. It is thus ensured that there are no operating states in which shortcircuiting can occur over a large area. Even in the event of an external fire which heats the cell to above 200° C., the ceramic separator will continue to perform its function.

If a shutdown mechanism is desired, this can be achieved in a simple manner by coating the surface of the separator layer with particles of a material which will melt on reaching a certain temperature and so close the pores in the separator layer and thus prevent any further ion flux. This can be achieved for example by means of an additionally applied polymeric or wax layer whose melting point is in the desired range.

The separator-electrode assembly according to the present invention is also very safe in the event of internal shortcircuiting due to an accident for example. If, for example, a nail would puncture a battery, the following would happen depending on the type of separator: a polymeric separator would melt at the site of puncture (a shortcircuit current flows through the nail and causes it to heat up) and contract. As a result, the shortcircuit location will become larger and larger and the reaction would get out of control. In the case of the separator layer according to the present invention which is equipped with a shutdown mechanism, the polymeric material of the shutdown layer would melt, but not the inorganic separator layer. So the reaction in the interior of the battery cell following such an accident would proceed much more moderately. This battery is thus distinctly safer than one equipped with a polymeric separator, which is why batteries having separator-electrode assemblies according to the present invention can be used in mobile applications in particular, where there is a distinctly higher risk of accidents than with stationary or portable applications.

The separator-electrode assembly of the present invention, by virtue of its simple manner of production, also has a distinct cost advantage over units which are produced in a conventional manner, since that requires the performance of an additional operation, namely the joining together of separator and electrode.

The preferred use for the production of the porous ceramic separator layer of precisely size-coordinated metal oxide particles provides a particularly high porosity to the ready-produced separator layer, although the porosity is still sufficiently small to prevent lithium whiskers growing through the separator. A particularly advantageous way to achieve an ideal pore size or porosity for the separator is for the metal oxide particles used, prior to the suspending, to be classified by wind sifting or hydroclassification in order that ideally equal-sized metal oxide particles may be used, since commercially available metal oxide particles frequently contain during production, storage and/or transportation a not inconsiderable fraction of particles which are distinctly smaller (eg fines or the like) or else distinctly larger (eg aggregates, agglomerates). But the presence of a large number of comparatively small particles has the consequence that the pores in the separator layer or even the pores in the electrode are partially obstructed, or completely occluded, by these small particles. It is then not always possible to achieve the ideal pore size or porosity for the separator.

Owing to the high porosity in connection with the low thickness of the separator layer and the very good wettability of the hydrophilic ceramic layer with polar solvents, it is also possible for the separator to be completely, or at least substantially completely, saturated with the electrolyte, so that it is impossible for dead spaces, in which no electrolyte is present, to arise in individual regions of the separator and hence in certain coils of the battery cells. This is achieved in particular when, by virtue of the size of the metal oxide particles being controlled, the separators are free or substantially free of closed pores into which the electrolyte cannot penetrate. Owing to the low thickness and the high porosity of the separator layer, the separator-electrode assembly is especially suitable for use in lithium high energy and high power batteries.

The separator-electrode assembly according to the present invention and a process for producing it will now be described without the invention being limited to these embodiments.

The separator-electrode assembly according to the present invention comprises a porous electrode useful as an electrode in a lithium battery and a separator layer applied to this electrode, characterized in that the separator-electrode assembly has an inorganic separator layer comprising at least two fractions of metal oxide particles different from each other in their average particle size and/or in the metal and an electrode whose active mass particles are bonded together and to the current collector by inorganic, electoconductive adhesives. In a preferred embodiment of the invention, the two particle fractions comprise metal oxide particles which differ not only in the metal but also in their particle size. The inorganic separator layer, as well as the inorganic substituents, may comprise small amounts of organic and especially silicon-organic compounds. The fraction of the inorganic separator layer which is made up of these organic constituents is however preferably less than 5% by weight, more preferably less than 1% by weight and more preferably less than 0.1% by weight. These silanes act as adhesion promoters to improve the bonding of the ceramic to the electrodes.

The two particle fractions in the separator layer, irrespectively of whether they comprise metal oxides of the same or different metals, preferably comprise particles whose particle sizes ($D_g$) and ($D_k$) differ by a factor of at least 10 and more preferably by a factor of at least 100. Preferably, the separator-electrode assembly of the present invention comprises a separator layer comprising metal oxide particles having an average particle size ($D_g$) greater or smaller than the average pore size (d) of the pores of the porous positive electrode which are adhered together by metal oxide particles having a particle size ($D_k$) smaller than the pores of the porous positive electrode, the separator layer forming a layer penetrating less than 20, more preferably 1 to 10 particle diameters and more preferably 1 to 3 particle diameters, $D_g$ into the pores of the electrodes when metal oxide particles having an average particle size ($D_g$) smaller than the average pore size (d) of the pores of the porous electrode are present. The thickness (z) of the separator layer is preferably less than 100 $D_g$ and not less than 1.5 $D_g$ and more preferably less than 20 $D_g$ and greater than 5 $D_g$ from the surface of the positive and negative electrode.

The metal oxide particles having an average particle size ($D_g$) greater or smaller than the average pore size (d) of the pores of the porous positive electrode are preferably $Al_2O_3$ and/or $ZrO_2$ particles. The metal oxide particles having an average particle size ($D_k$) smaller than the average pore size (d) of the pores of the porous positive electrode are preferably $SiO_2$ and/or $ZrO_2$ particles.

The separator-electrode assemblies according to the present invention more preferably comprise metal oxide particles having an average particle size ($D_g$) greater or smaller than the average pore size (d) of the pores of the porous positive electrode have an average particle size ($D_g$) of less than 10 µm, preferably less than 5 µm and most preferably less than 3 µm. For a separator layer thickness of 5 $D_g$, an average particle size of 3 µm will thus result in a separator layer thickness of about max. 15 µm. Preferred separator layer thicknesses are less than 25 µm and preferably in the range from 10 to 15 µm. If necessary, however, the separator layer thickness can also be less than 10 µm. The add-on weights are preferably in the range from 10 to 200 $g/m^2$, more preferably less than 100 $g/m^2$ and most preferably less than 50 $g/m^2$.

The porosity of the separator layer of the separator-electrode assembly according to the present invention is preferably in the range from 30 to 70% (determined by mercury porosimetry). By virtue of the high porosity, the good wettability and the low thickness of the separator layer, the separator layer is readily impregnable or fillable with electrolytes, which is why the separator layer exhibits a relatively high ion conductivity. The low thickness provides a particularly low electrical resistance for the separator in use with an electrolyte. The separator-electrode assembly is therefore particularly suitable for high power batteries. The separator itself naturally has a very high electrical resistance, since it itself has to have insulating properties. In addition, comparatively thin separators permit an increased packing density in a battery stack, so that a larger amount of energy can be stored in the same volume. The separator-electrode assembly is therefore particularly useful for high energy batteries.

The electrode in the separator-electrode assembly of the present invention comprises active mass particles having an average particle size in the range from 100 nm to 25 µm, preferably in the range from 200 nm to 15 µmm and more preferably in the range from 500 nm to 10 µm.

When the SEA is an assembly to be used as a positive electrode, the active mass of this positive electrode will preferably be an active mass comprising at least one of the elements Co, Ni, Mn, V, Fe or P. Preferably, the positive electrodes have active masses selected from $LiNi_{1-y}CO_yO_2$ (where y=0 to 1), $LiMn_2O_4$, $LiMnO_2$, $LiFePO_4$, $LiVOPO_4$ and/or $LiNiVO_4$. The current collectors in assemblies used as positive electrodes are preferably current collectors comprising aluminum. The current collectors are preferably foils or expanded metals comprising this material or fabricated therefrom. Preferably, the positive electrode used according to the present invention has a very high porosity, preferably in the range from 20 to 50% (determined by Hg porosimetry) in order that a very large active surface area may be provided. More preferably, the positive electrode has an average pore size (d) in the range from 0.1 to 20 µm and preferably in the range from 1 to 10 µm. The current collector may be either singly or preferably bothsidedly coated.

Bothsidedly coated positive electrodes preferably have a thickness in the range from 20 to 250 µm and a basis weight in the range from 50 to 800 g/m².

When the SEA of the present invention is an assembly that is to be used as the negative electrode, its active mass preferably comprises at least one of the elements C, Si, Nb, Ti, Mo or W. More preferably, negative electrodes have active masses selected from graphite, silicon, graphite-silicon mixtures, lithium-silicon or lithium-tin containing alloys, $LiNb_2O_5$, $LiTiO_2$, $Li_4Ti_5O_{12}$, $LiMoO_2$ and/or $LiWO_2$. The current collectors used as negative electrodes preferably comprise copper or carbonized polyacrylo-nitrile. The current collectors are preferably foils or expanded metals comprising this material or fabricated therefrom. Preferably, the positive electrode used according to the present invention has a very high porosity, preferably in the range from 20 to 50% (determined by Hg porosimetry) in order that a very large active surface area may be provided. More preferably, the electrode according to the invention has an average pore size (d) in the range from 0.1 to 20 µm and preferably in the range from 1 to 10 µm. The current collector may be either singly or preferably bothsidedly coated. Bothsidedly coated negative electrodes preferably have a thickness in the range from 20 to 250 µm and a basis weight in the range from 50 to 800 g/m².

However, the values of the SEAs used as a positive electrode or as a negative electrode may also distinctly differ, depending on the battery maker's requirements. High power batteries are typically designed to have electrodes having a very thin electrode layer. High energy batteries are desired to have a very thick electrode layer, although the possible thickness is restricted by the charging/discharging rate which rapidly decreases with increasing thickness. Preferred electrodes include a current collector 10 to 50 µm in thickness. Preferred electrodes for high power batteries have a thickness of 5 to 25 µm per electrode layer. Preferred electrodes for high energy batteries have a thickness of 15 to 100 µm per electrode layer. These particulars apply to both positive and negative electrodes.

The adhesive connecting the active mass particles to one another and to the current collector preferably comprise nanoscale particles having an average primary particle size in the range from 1 to 100 nm and preferably in the range from 5 to 50 nm. Determining the particle size is relatively difficult since the particles other than nanoscale particles used have formed from sols. The inorganic, electroconductive adhesives are preferably nanoscale particles of active mass for electrodes, the active mass for positive electrodes preferably comprising at least one of the elements Co, Ni, Mn, V, Fe or P and for negative electrodes preferably comprising at least one of the elements C, Si, Nb, Ti, Mo or W, or nanoscale electroconductive particles comprising or consisting of a compound selected from titanium suboxide, titanium nitride, titanium carbide, doped (for example with fluorine or antimony) or undoped tin oxide, indium-tin oxide (ITO) and doped or undoped zinc oxide. Preferably, the nanoscale active mass particles used as an inorganic adhesive have the same composition as the active mass particles themselves. The nanoscale active mass particles present as an adhesive are in each case logical such as are compatible with the use of the electrodes as a positive or negative electrode.

For both electrodes, and in the case of current collectors coated bothsidedly with a porous electrode layer, the separator layer can be applied on one or both of the sides, depending on what the battery customer wants for their operation.

The mechanical properties of the separator-electrode assembly are essentially determined by the electrode because of the low thickness of the separator layer. Typical tensile strengths are in the region of the tensile strengths of the metallic support used to make the separator-electrode assembly. This tensile strength is about 10 N/cm or higher in the case of expanded metals, depending on the expanded metal used, and more than 15 N/cm where metal foils are used. The separator-electrode assembly may be made flexible, flexibility being determined essentially by the flexibility of the current collectors. Preferably, a separator-electrode assembly according to the present invention is bendable down to a radius of 100 m, preferably a radius of 100 m down to 1 cm and more preferably of 1 cm down to 5, 4, 3, 2 or 1 mm.

In order that the separator-electrode assembly according to the present invention has a shutdown mechanism, it may be preferable for the separator layer to comprise a coating with preferably waxy or polymeric shutdown particles which melt at a desired shutdown temperature. Particularly preferred materials for the shutdown particles include for example natural or artificial waxes, low-melting polymers, eg polyolefins, the material for the shutdown particles being selected such that the particles melt at the desired shutdown temperature and close the pores of the separator, preventing further ion flux.

The coating with shutdown particles may be present on the separator layer and/or between the separator layer and the electrode. But it is preferable, depending on the desired shutdown temperature, for the coating with shutdown particles to have been applied to the separator layer. This is dictated inter alia by the way the shutdown particle coating is produced. Coating between the separator layer and the electrode would have to be effected by applying the shutdown particle layer to the electrode and subsequently applying the separator layer and therefore is only ever possible when the shutdown temperature and hence the melting point of the material of the shutdown particles, for example natural or artificial wax, low-melting polymers, eg polyolefins, is above the temperature which has to be employed to solidify the separator layer.

The shutdown particles preferably have an average particle size ($D_w$) which is not less than the average pore size ($d_s$) of the pores of the separator layer and, when the shutdown layer is situated between separator and electrode, is likewise greater than the average pore size (d) of the pores of the porous electrode. This is advantageous in particular because this prevents pores of the electrodes or of the separator layer being penetrated and closed, which would result in a reduction in the pore volume and hence in the conductivity of the separator and also the performance of the battery. The thickness of the shutdown particle layer is only critical insofar as an excessively thick layer would unnecessarily increase the resistance in the battery system. To ensure safe shutdown, the shutdown particle layer shall have a thickness ($z_w$) ranging from approximately equal to the average particle size of the shutdown particles ($D_w$) up to 10 $D_w$ and preferably from 2 $D_w$ to $D_w$.

The overall thickness of the separator-electrode assembly (without the additional shutdown particle layer) is greatly dependent on the thickness of the electrode. Typically, in the case of bothsidedly coated electrodes, the thickness is less than 350 µm, preferably less than 250 µm and most preferably less than 200 µm at an otherwise constant cell capacity.

The separator-electrode assemblies of the present invention are preferably produced by a process for producing separator-electrode assemblies which is characterized in that it comprises forming a porous electrode useful as a positive (cathode) or negative (anode) electrode in a lithium battery by applying a suspension comprising active mass particles suspended in a sol or a dispersion of nanoscale active mass particles in a solvent and solidifying the suspension to form an all-inorganic porous electrode layer on a current collector by at least one thermal treatment, and in that a porous inorganic coating separator layer is formed on the electrode substrate thus produced by applying a suspension comprising metal oxide particles in a sol and solidifying the inorganic separator layer on the electrode by at least one thermal treatment.

Production of the Electrode

Depending on whether the electrode, or the SEA produced using it, is to be used as a positive or negative electrode, the method of production utilizes a suspension comprising active mass particles suitable for the particular intended purpose. To produce the porous electrode layer of the positive electrode it is preferable to utilize a suspension comprising active mass particles selected from particles comprising at least one of the elements Co, Ni, Mn, V, Fe or P. Preference is given to using active mass particles comprising a compound selected from $LiNi_{1-y}CO_yO_2$ (where y=0 to 1), $LiMn_2O_4$, $LiMnO_2$, $LiFePO_4$, $LiVOPO_4$ and/or $LiNiVO_4$ or which consist thereof. The porous electrode layer of the negative electrode is preferably produced using a suspension comprising active mass particles selected from particles comprising at least one of the elements C, Si, Nb, Ti, Mo or W. Particular preference is given to active mass particles comprising or consisting of a compound/element selected from graphite, carbon black, silicon, graphite-silicon mixtures, lithium-silicon or lithium-tin containing alloys, $LiNb_2O_5$, $LiTiO_2$, $Li_4Ti_5O_{12}$, $LiMoO_2$ and/or $LiWO_2$. Preference is given to using active mass particles having an average particle size in the range from 0.1 to 25 µm. The use of active mass particles within the indicated range makes it possible to achieve a particularly high porosity for the porous electrode layer and thereby high storage capacity for the battery.

The suspension for producing the positive electrode layer is preferably produced using a sol comprising at least one of the elements Co, Ni, Mn, V, Fe, P, for example in the form of $LiNi_{1-y}CO_yO_2$ (where y=0 to 1), $LiMn_2O_4$, $LiMnO_2$, $LiFePO_4$, $LiVOPO_4$ and/or $LiNiVO_4$, or a compound selected from titanium suboxide, titanium nitride, titanium carbide, doped or undoped tin oxide, indium-tin oxide (ITO) and doped or undoped zinc oxide. It is similarly possible to produce a suspension for producing the positive electrode layer by using a dispersion of nanoscale particles having an average primary particle size of less than 50 nm comprising at least one of the elements Co, Ni, Mn, V, Fe or P or comprising a compound selected from titanium suboxide, titanium nitride, titanium carbide, doped or undoped tin oxide, indium-tin oxide (ITO) and doped or undoped zinc oxide, or consist of one of these compounds. Preferably, the nanoscale particles used are nanoscale active mass particles comprising or consisting of a compound selected from $LiNi_{1-y}CO_yO_2$ (where y=0 to 1), $LiMn_2O_4$, $LiMnO_2$, $LiFePO_4$, $LiVOPO_4$ and/or $LiNiVO_4$. The suspension properties in the negative electrode layer may be produced using for example a sol comprising at least one of the elements Nb, Ti, Mo, W, for example in the form of $LiNb_2O_5$, $LiTiO_2$, $Li_4Ti_5O_{12}$, $LiMoO_2$ and/or $LiWO_2$ or a compound selected from titanium suboxide, titanium nitride, titanium carbide, doped or undoped tin oxide, indium-tin oxide (ITO) and doped or undoped zinc oxide. It is similarly possible here for the suspension for producing the negative electrode layer to be produced using a dispersion of nanoscale particles having an average primary particle size of less than 50 nm comprising at least one of the elements C (as carbon black for example), Si, Nb, Ti, Mo or W, or comprising or consisting of at least one compound selected from titanium suboxide, titanium nitride, titanium carbide, doped or undoped tin oxide, indium-tin oxide (ITO) and doped or undoped zinc oxide. Preferably, the nanoscale particles used are nanoscale active mass particles comprising or consisting of a compound/element selected from graphite, silicon, graphite-silicon mixtures, lithium-silicon or lithium-tin containing alloys, $LiNb_2O_5$, $LiTiO_2$, $Li_4Ti_5O_{12}$, $LiMoO_2$ and/or $LiWO_2$. The suspension for producing the porous electrode layers is preferably applied to the current collector by printing on, pressing on, pressing in, rolling on, knifecoating on, brushing on, dipping, spraying or pouring on.

The sols are obtained by hydrolyzing at least one compound of the elements mentioned. It may similarly be preferable for the compound to be hydrolyzed to be introduced into alcohol or an acid or a combination of these liquids prior to hydrolysis. The compound to be hydrolyzed is preferably at least one nitrate, chloride, carbonate or alkoxide compound of the elements Ti, Co or Mn, such as eg $TiCl_4$ or $Mn(NO_3)_2$. The hydrolysis is preferably carried out in the presence of liquid water, water vapor, ice or an acid or a combination thereof.

In one embodiment of the process according to the present invention, hydrolysis of the compounds to be hydrolyzed is used to prepare particulate sols. These particulate sols are notable for the compounds formed by hydrolysis being present in the sol in particulate form. The particulate sols can be prepared as described above or as in WO 99/15262. These sols customarily have a very high water content, which is preferably above 50% by weight. It may be preferable for the compound to be hydrolyzed to be introduced into alcohol or an acid or a combination of these liquids prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof. The particulate sols thus prepared can be subsequently used for preparing suspensions.

In a further embodiment of the process according to the present invention, hydrolysis of the compounds to be hydrolyzed is used to prepare polymeric sols. These polymeric sols are notable for the fact that the compounds formed by hydrolysis are present in the sol in polymeric form, i.e. in the form of chains crosslinked across a relatively large space. The polymeric sols customarily include less than 50% by weight: and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To prepare these sols with the desired very low fraction of water and/or acid in the sol, it may be preferable for the compound to be hydrolyzed to be dissolved in an organic solvent, especially ethanol, isopropanol, butanol, amyl alcohol, hexane, cyclo-hexane, ethyl acetate and/or mixtures thereof, before the actual hydrolysis is carried out.

As mentioned, as well as using a suspension of active mass particles and a sol, it is also possible to use suspensions comprising active mass particles suspended in a dispersion or nanoscale active mass particles in a solvent. The nanoscale active mass particles or particles of electroconductive materials preferably have an average primary particle size of less than 50 nm, more preferably in the range from 1 to 50 nm and even more preferably in the range from 5 to 25 nm. Such nanoscale active mass particles are obtainable for example by a pyrogenic operation like catalytic aerosol production or via sol-gel chemistry. Useful solvents for these suspensions include as well as water in particular alcohols, in particular C1 to C4 alcohols, preferably methanol, ethanol of propanols, for example isopropanol.

The active mass particles are preferably suspended by intense mixing in the sol or the dispersion of nanoscale active mass particles in a solvent. The suspension for producing the electrode layer can be applied to the current collector by printing on, pressing on, pressing in, rolling on, knifecoating on, brushing on, dipping, spraying or pouring on for example. Preferably, the electrode layer is produced using a suspension wherein the weight ratio of active mass particles to sol or dispersion comprising nanoscale (active mass) particles is in the range from 1:100 to 2:1, preferably in the range from 1:50 to 1:5 and more preferably in the range from 1:4 to 1:1.

The porous electrode layers of the present invention are applied by solidifying the suspension on the current collector so that an electrode useful for the separator-electrode assembly of the present invention is obtained in this way. This principle is already described in WO 99/15262. Preferably, the suspension applied to the current collector is solidified by heating to a temperature in the range from 50 to 700° C., preferably in the range from 100 to 600° C. and most preferably in the range from 300 to 500° C. The heating preferably takes not more than 60 minutes, preferably not more than 10 minutes and more preferably from 0.1 to 10 minutes, preferably at a temperature ranging from 300 to 500° C. The temperature and duration of the treatment is prescribed by the thermal stability of the materials present in the current collector used, and is to be adapted accordingly. The heating according to the present invention can be effected by means of heated air, hot air, infrared irradiation or by other heating methods of the prior art.

The current collector can be coated according to the present invention in a batchwise or continuous manner. The coating, i.e., the production of the electrode layer, is preferably carried out by unwinding the current collector substrate off a reel, passing it at a speed ranging from 1 m/h to 2 m/s, preferably from 0.5 m/min to 20 m/min and most preferably at a speed from 1 m/min to 5 m/min through at least one apparatus applying the suspension to the surface of the current collector, for example a roll or squeegee, and at least one further apparatus whereby the suspension is solidified on the current collector surface and if appropriate in the interior of the current collector when an expanded metal is used, for example, by heating, for example an electrically heated surface, and winding the thus produced electrode up on a second reel at the end. This makes it possible to produce the separator-electrode assembly of the present invention in a continuous flow process.

Making the Separator Layer

The substrate to which the separator layer is applied is an electrode produced as just described. Depending on the purpose for which the SEA is to be used, the electrode used is useful as a positive electrode or as a negative electrode.

The present invention's coating of a negative electrode with the ceramic separator layer is preferred, since these are usually less moisture sensitive than the positive electrodes, which generally include the lithium compound. When positive electrodes are used as a base, it has to be ensured that the SEA is absolutely free of water before the battery is assembled.

The electrodes used may be equipped with a porous electrode layer on one or both sides of the current collector. Preferred electrodes have a very high porosity (determined by Hg porosimetry), preferably in the range from 20 to 50%, to provide a very large active surface area. The porosity can be determined for example using a 4000 porosimeter from Carlo Erba Instruments. Mercury porosimetry is based on the Washburn equation (E. W. Washburn, "Note on a Method of Determining the Distribution of Pore Sizes in a Porous Material", Proc. Natl. Acad. Sci., 7, 115-16 (1921)). Particularly preferred electrodes have average pore sizes (d) of 0.1 to 20 µm and preferably of 1 to 10 µm. The bothsidedly coated positive electrodes to be used as a substrate preferably have a thickness in the range from 20 to 250 µm and a basis weight in the range from 50 to 800 g/m². Bothsidedly coated negative electrodes useful as a substrate preferably have a thickness in the range from 200 to 250 µm and the basis weight in the range from 350 to 450 g/m².

The suspension used according to the present invention to produce the separator layer preferably comprises metal oxide particles having an average particle size ($D_g$) greater than, equal to or else smaller than the average pore size (d) of the pores of the porous positive electrode, although in the presence of particles having an average particle size $D_g$ not greater than the average pore size (d) of the porous electrode the suspension has to additionally contain an agent to raise the viscosity of the suspension to prevent excessive penetration of the suspension into the porous electrode. To produce the suspension $Al_2O_3$ and/or $ZrO_2$ particles are preferably used as metal oxide particles or as metal oxide particles having an average particle size ($D_g$) not less than the average pore size (d) of the pores of the porous electrode layer of the electrodes used. The particles used as metal oxide particles more preferably have an average particle size $D_g$ of less than 10 µm, preferably of less than 5 µm and most preferably of less than 3 µm.

It has been determined that the use of commercially available metal oxide particles may in certain circumstances lead to unsatisfactory results, since the particle size distribution is frequently too wide. Preference is therefore given to using metal oxide particles classified by a conventional process, for example wind sifting or hydroclassification. This measure ensures that the inorganic porous separator layer has a uniform pore size distribution.

The suspension can be applied to the substrate by printing on, pressing on, pressing in, rolling on, knifecoating on, brushing on, dipping, spraying or pouring on for example. Preference is given to using a suspension wherein the weight ratio of metal oxide particles to the sols in the range from 1:1000 to 2:1, preferably in the range from 1:100 to 1:5 and more preferably in the range from 1:4 to 1:1.

The suspension used to produce the coating comprises at least one inorganic oxide of aluminum, of silicon and/or of zirconium and at least one sol of the elements Al, Zr and Si and is produced by suspending particles of one oxide at least in at least of these sols.

The sols are obtained by hydrolyzing at least one compound of the elements Zr, Al, Si. It can be similarly advantageous for the compound to be hydrolyzed to be introduced into alcohol or a combination of these liquids prior to hydrolysis. The compound to be hydrolyzed is preferably used on nitrate, chloride, carbonate or alkoxide compound of the elements Zr, Al or Si. The hydrolysis is preferably carried out in the presence of liquid water, water vapor, ice or an acid or a combination thereof.

It is again possible to use particulate or polymeric sols. With regard to the production of the sols, reference is made to the production of the sols in the section "Making the electrode". As a result of the fact that the electrodes used are completely devoid of organic compounds and polymers in particular, the addition of adhesion promoters to the sols can be dispensed with.

Depending on the type of suspension used, it can be necessary to adjust the viscosity of the suspension. This is especially necessary when the suspension used comprises particles which are smaller than the average pore size of the pores of the porous electrode layer. Adjusting the suspension to an appropriately high viscosity prevents penetration of the suspension into the pores of the electrode in the absence of external shearing forces (nonnewtonian behavior). Such behavior is obtainable for example by adding auxiliaries which influence the flow behavior. The auxiliaries used for adjusting the viscosity of the suspension are likewise preferably inorganic materials. It is particularly preferable to add pyrogenic silicas, for example Aerosils from Degussa AG, eg Aerosil 200, to the suspension to adjust the viscosity of the suspension. Since these substances are very effective as auxiliaries for adjusting the viscosity, it is sufficient for the mass fraction of silica in the suspension to be in the range from 0.1 to 10% by weight and preferably in the range from 0.5 to 5% by weight.

The separator layers according to the present invention are applied by solidifying the suspension on the substrate, i.e. the surface of the electrode, to thereby obtain a separator-electrode assembly. This principle is likewise already described in WO 99/15262. It is preferable to solidify the suspension which has been applied to the electrode by heating to 50-700° C., preferably 100-600° C. and most preferably 300-500° C. Heating is preferably effected for not more than 60 minutes, preferably not more than 10 minutes and more preferably in the range from 0.1 to 10 minutes, preferably at a temperature of from 300 to 500° C. Treatment temperature and duration are dictated by the thermal stability of the materials present in the electrode used and must be adapted accordingly.

The composite may be heated according to the present invention by means of heated air, hot air, infrared radiation or by other heating methods of the prior art.

The electrode can be coated according to the present invention in a batchwise or continuous manner. The production of the separator layer is preferably carried out by unwinding the electrode substrate off a reel, passing it at a speed of from 1 m/h to 2 m/s, preferably at a speed of from 0.5 m/min to 20 m/min and most preferably at a speed of from 1 m/min to 5 m/min through at least one apparatus which applies the suspension to the surface of the electrode, for example a roll, and at least one further apparatus whereby the suspension is solidified on the electrode surface by heating, for example an electrically heated furnace, and winding the thus produced separator-electrode assembly up on a second reel at the end. This makes it possible to produce the separator-electrode assembly according to the present invention in a continuous flow process.

The separator-electrode assembly may be equipped with an automatic shutdown mechanism by, for example, applying a layer of shutdown particles which, at a desired temperature, melt and close the pores of the separator layer to the separator-electrode assembly after the solidification of the suspension which has been applied to the electrode, and fixing the layer of shutdown particles. The layer of shutdown particles may be formed for example by applying a suspension of waxy particles having an average particle size which is greater than the average pore size of the separator layer in a sol, water, solvent or solvent mixture.

The suspension for applying the particles contains preferably from 1 to 50% by weight, more preferably from 5 to 40% by weight and most preferably from 10 to 30% by weight of waxy particles in the suspension.

Since the inorganic separator layers frequently have a very hydrophilic character, it has been determined to be advantageous for the separator-electrode assembly to have been prepared using a silane in a polymeric sol as an adhesion promoter and thus to have been hydrophobicized. To achieve good adhesion and uniform distribution of the shutdown particles in the shutdown layer on hydrophilic as well as hydrophobic porous inorganic separator layers, there are several possibilities.

In one version of the process according to the present invention, it has been determined to be advantageous to hydrophobicize the porous inorganic layer of the separator before the shutdown particles are applied. The production of hydrophobic membranes which works according to the same principle is described in WO 99/62624 for example. Preferably, the porous inorganic separator layer is hydrophobicized by treatment with alkyl-, aryl- or fluoroalkylsilanes marketed for example by Degussa under the trade name of Dynasilan. It is possible in this context to employ for example the familiar hydrophobicization methods which are employed inter alia for textiles (D. Knittel; E. Schollmeyer; *Melliand Textilber.* (1998) 79(5), 362-363), with minimal changes to the recipes, for the porous separator layers or the separator-electrode assembly as well. To this end, the separator-electrode assembly is treated with a solution which includes at least one hydrophobic material. It can be advantageous for the solvent in the solution to be water, preferably adjusted to a pH of 1-3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy(3,3,4,4,5,5,6,6,7,7,8,8-tridecafluorooctyl)-silane, but a treatment with methyltriethoxysilane or i-butyltriethoxysilane is completely sufficient to obtain the desired effect. The solutions are stirred at room temperature to achieve uniform dissipation of the hydrophobic materials in the solution and subsequently applied to the separator layer of the separator-electrode assembly and dried. Drying can be speeded up by treatment at temperatures from 25 to 100° C.

In a further version of the process according to the present invention, the porous inorganic separator layer can also be treated with other adhesion promoters before the shutdown particles are applied. The treatment with one of the hereinbelow mentioned adhesion promoters can then likewise be effected as described above, i.e. by treating the porous inorganic layer with a polymeric sol which includes a silane adhesion promoter.

The layer of shutdown particles is preferably created by applying to the separator layer a suspension of shutdown particles in a suspension medium selected from the group consisting of a sol, water, solvents, for example alcohol, ether or ketones, and a solvent mixture and then drying. The particle size of the shutdown particles present in the suspension is arbitrary in principle. However, it is advantageous for the suspension to include shutdown particles having an average particle size ($D_w$) of not less than and preferably greater than the average size of the pores of the porous inorganic separator layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

To employ shutdown particles smaller in size than the pores of the porous inorganic layer, the particles must be prevented from penetrating into the pores of the porous inorganic separator layer. Reasons for employing such particles include for example large price differences, but also availability. One way of preventing the penetration of shutdown particles into the pores of the porous inorganic layer is to control the viscosity of the suspension in such a way that absent external shearing forces no penetration of the suspension into the pores of the inorganic layer on the separator takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 10% by weight and preferably from 0.5% to 50% by weight of silica, based on the suspension, will frequently be sufficient to achieve a sufficiently high viscosity for the suspension. The fraction of auxiliaries can in each case be determined by simple preliminary tests.

It can be advantageous for the suspension used, which contains shutdown particles, to contain adhesion promoters. Such a suspension with adhesion promoters can be applied directly to a layer of the separator even when the layer was not hydrophobicized beforehand. It will be appreciated that a suspension with adhesion promoters can also be applied to a hydrophobicized separator layer or to a separator layer which has been made employing an adhesion promoter. Adhesion promoters useful in the shutdown particle suspension are preferably silanes having amino, vinyl or methacryloyl side groups. Such adhesion promoters include for example AMEO (3-aminopropyltriethoxysilane), MEMO (3-methacryloyloxypropyltrimethoxysilane), Silfin (vinylsilane+initiator+catalyst), VTEO (vinyltriethoxysilane) or VTMO (vinyltrimethoxysilane). Such silanes are also available for example from Degussa as an aqueous solution under the designation Dynasilan 2926, 2907 or 2781. An adhesion promoter fraction of not more than 10% by weight has been determined to be sufficient for ensuring sufficient adhesion of the shutdown particles to the porous inorganic separator layer. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of polypropylene or polyethylene wax.

The shutdown particle suspension may be applied to the porous inorganic layer of the separator by printing on, pressing on, pressing in, rolling on, knifecoating on, spreadcoating on, dipping, spraying or pouring on. The shutdown layer is preferably obtained by drying the applied suspension at a temperature from room temperature to 100° C. and preferably from 40 to 60° C.

It may be preferable for the particles to be fixed after they have been applied to the porous inorganic separator layer, by heating one or more times to a temperature above the glass transition temperature, so that the particles are fused on without undergoing a change in the actual shape. This makes it possible to ensure that the shutdown particles adhere particularly firmly to the porous inorganic separator layer.

The applying of the suspension with subsequent drying and any heating to above the glass transition temperature can be carried out continuously or quasicontinuously. When the starting material used is a flexible separator-electrode assembly it can again be unwound off a reel, passed through a coating, drying and, if used, heating apparatus and then be reeled up again.

Separator-electrode assemblies according to the present invention can be used in batteries, especially lithium batteries. The separator-electrode assemblies according to the present invention are suitable for primary and secondary (rechargeable) lithium batteries. When the separator-electrode assembly is used according to the present invention in batteries, it is, for example, connected to the counterelectrode and saturated with electrolyte. Owing to the particularly high porosity and pore size and also the low thickness of the separator layer, the separator-electrode assembly according to the present invention is especially suitable for use in lithium high power and high energy batteries.

The present invention also provides the lithium batteries themselves, and these may be primary and secondary batteries which comprise a separator-electrode assembly of the present invention. Such batteries may similarly be lithium high power and high energy batteries. The separator layer of the separator-electrode assembly according to the present invention, when used in such lithium batteries, customarily comprises electrolytes which are lithium salts having large anions in carbonate solvents. Suitable lithium salts include for example $LiClO_4$, $LiBF_4$, $LiAsF_6$, $LiCF_3SO_3$ or $LiPF_6$, of which $LiPF_6$ is particularly preferred. Suitable organic carbonate solvents include for example ethylene carbonate (EC), propylene carbonate (PC), dimethyl carbonate (DMC), ethyl methyl carbonate or diethyl carbonate or mixtures thereof.

The separators according to the present invention are similarly suitable for use in rapidly charged batteries. Owing to the high thermal stability of the separator according to the present invention, a battery which is equipped with this separator will not be so thermally sensitive and therefore will be able to withstand the temperature increase due to the rapid charging without adverse changes to the separator or damages to the battery. These batteries are consequently distinctly more rapid to charge. This is a distinct advantage with regard to the use of thus equipped batteries in electric vehicles, since these no longer have to be charged for several hours but instead the charging can be done within distinctly shorter periods, i.e. within a few hours and preferably in less than an hour.

The present invention is described by the examples which follow without being limited thereto.

EXAMPLE 1

Production of an Inventive Positive Electrode

To produce a $TiO_2$ sol, 10 g of $Ti(i-OProp)_4$ are dissolved in 89 g of isopropanol. This solution is admixed with 1 g of 5% $HNO_3$. The precipitate formed is stirred for 3 days at room temperature with a magnetic stirrer. 80 g of $LiCoO_2$ (Ferro), 10 g of graphite (KS6 Timcal) and 2 g of carbon black (Superior Graphite) are dispersed in the above $TiO_2$ sol.

An aluminum foil 30 µm in thickness is coated with this dispersion in a knifecoating operation (gap: 200 µm). The electrode is dried at 80 to 100° C. with hot air and then solidified at 250° C. for 30 min.

EXAMPLE 2

Production of an Inventive Negative Electrode

To produce a $TiO_2$ sol, 10 g of $Ti(i-OProp)_4$ are dissolved in 89 g of isopropanol. This solution is admixed with 1 g of 5% $HNO_3$. The precipitate formed is stirred for 3 days at room temperature with a magnetic stirrer. 79 g of $LiTiO_3$ (Degussa experimental product, produced by flame pyrolysis), 1 g of $Li_2O$ (Merck), 10 g of graphite (KS6 Timcal) and 2 g of carbon black (Superior Graphite) are dispersed in the above $TiO_2$ sol.

An aluminum foil 30 µm in thickness is coated with this dispersion in a knifecoating operation (gap: 200 µm). The electrode is dried at 80 to 100° C. with hot air and then solidified at 250° C. for 30 min.

EXAMPLE 3

Production of an Inventive Separator-Cathode Assembly SEA100K 75 g of $Al_2O_3$ (AlCoA, CT3000 SG) are dissolved in 160 g of ethanol. This solution is admixed with 20 g of tetraethoxysilane (Dynasilan A, Degussa AG) and also 15 g of 5% $HNO_3$. The mixture is stirred overnight to obtain an efficient dispersion of the $Al_2O_3$ powder.

An electrode according to Example 1 is coated therewith in a knifecoating batch operation (gap: 50 µm, forward feed speed: 0.5 m/min) and dried and solidified at 250° C. for 30 min. The add-on weight is now at about 45 g/m², the separator layer thickness is just on 20 µm. The average pore size in the separator layer is about 100 nm.

EXAMPLE 4

Production of an Inventive Separator-Anode Assembly SEA240A 75 g of $Al_2O_3$ (AlCoA, CT3000 SG) are dissolved in 160 g of ethanol. This solution is admixed with 20 g of tetraethoxysilane (Dynasilan A, Degussa AG) and also 15 g of 5% $HNO_3$. The mixture is stirred overnight to obtain an efficient dispersion of the $Al_2O_3$ powder.

An electrode according to Example 2 is coated therewith in a knifecoating batch operation (gap: 50 µm, forward feed speed: 0.5 m/min) and dried and solidified at 250° C. for 30 min. The add-on weight is now at about 45 g/m², the separator layer thickness is just on 20 µm. The average pore size in the separator layer is about 240 nm.

EXAMPLE 5

Production of an Inventive Separator-Anode Assembly SEA240A 50 g of $ZrO_2$ (Degussa, Aerosil VPH) are dispersed in 80 g of ethanol and 80 g of water. This solution is admixed with 20 g of tetraethoxysilane (Dynasilan A, Degussa AG) and also 15 g of 5% $HNO_3$. The mixture is stirred overnight to obtain an efficient dispersion of the $Al_2O_3$ powder.

An electrode according to Example 2 is coated therewith in a knifecoating batch operation (gap: 50 µm, forward feed speed: 0.5 m/min) and dried and solidified at 250° C. for 30 min. The add-on weight is now at about 10 g/m², the separator layer thickness is just on 5 µm. The average pore size in the separator layer is about 30 nm.

EXAMPLE 6

Lithium Battery Comprising an Inventive Separator Electrode Assembly

The separator-cathode assembly of Example 3 and the anode of Example 2 are used to construct a battery cell by laminating the separator-electrode assembly to the anode. The battery is drenched with an electrolyte of a 1 molar solution of $LiPF_6$ in ethylene carbonate/dimethyl carbonate. The battery will give stable running for several hundred cycles. The irreversible overall loss is less than 20%.

EXAMPLE 7

Lithium Battery Comprising an Inventive Separator Electrode Assembly

The cathode of Example 1 and the separator-anode assembly of Example 4 are used to construct a battery cell by laminating the separator-electrode assembly to the anode. The battery is drenched with an electrolyte of a 1 molar solution of $LiPF_6$ in ethylene carbonate/dimethyl carbonate. The battery will give stable running for several hundred cycles. The irreversible overall loss is less than 20%.

What is claimed is:

1. A method of manufacturing a lithium battery comprising forming said battery using a porous electrode and a separator layer applied to the electrode, thereby forming a separator-electrode assembly,
   wherein the separator-electrode assembly comprises:
   a current collector;
   a porous electrode on the current collector; and a separator layer applied to the porous electrode;
   wherein the separator layer is an inorganic separator layer comprising at least two fractions of metal oxide particles different from each other in their average particle size and/or in the metal, and active mass particles of the porous electrode are bonded together and to the current collector by an inorganic, electroconductive adhesive, and
   wherein the separator-electrode assembly comprises no organic polymer binder.

2. The method according to claim 1, wherein the at least two fractions comprises metal oxide particles having an average particle size ($D_g$) greater or smaller than the average pore size (d) of the pores of the porous electrode; and
   metal oxide particles having a particle size ($D_k$) smaller than the pores of the porous positive or negative electrode,
   wherein the metal oxide particles having an average particle size ($D_g$) are adhered together by the metal oxide particles having a particle size ($D_k$),
   the separator layer penetrates less than 20 $D_g$ into the pores when metal oxide particles having an average particle size ($D_g$) smaller than the average pore size (d) of the pores of the porous electrode.

3. The method according to claim 1, wherein the separator layer has a thickness (z) which is less than 100 $D_g$ and not less than 1.5 $D_g$.

4. The method according to claim 1, wherein the porous electrode is a porous positive electrode and the metal oxide particles having an average particle size ($D_g$) greater or smaller than the average pore size (d) of the pores of the porous positive electrode are $Al_2O_3$ and/or $ZrO_2$ particles.

5. The method according to claim 1, wherein the metal oxide particles having an average particle size ($D_k$) smaller than the average pore size (d) of the pores of the porous electrode are $SiO_2$ and/or $ZrO_2$ particles.

6. The method according to claim 1, wherein the metal oxide particles having an average particle size ($D_g$) greater or smaller than the average pore size (d) of the pores of the porous electrode have an average particle size ($D_g$) of less than 10 μm.

7. The method according to claim 1, wherein the separator layer comprises a further coating comprising shutdown particles which melt at a desired shutdown temperature.

8. The method according to claim 1, wherein the separator layer has a porosity in the range from 30 to 70%.

9. The method according to claim 1, wherein the active mass particles have an average particle size in the range from 0.1 to 25 μm.

10. The method according to claim 1, wherein when the electrode is a positive electrode, the active mass particles comprise at least one of the elements Co, Ni, Mn, V, Fe or P and when the electrode is a negative electrode, the active mass particles comprise C, Si, Nb, Ti, Mo or W as at least one of the elements.

11. The method according to claim 10, wherein the positive electrode comprises active mass particles selected from $LiNi_{1-y}Co_yO_2$ (where y=0 to 1), $LiMn_2O_4$, $LiMnO_2$, $LiFePO_4$, $LiVOPO_4$ and/or $LiNiVO_4$, and the negative electrode comprises active mass particles selected from graphite, silicon, graphite-silicon mixtures, lithium-silicon or lithium-tin containing alloys.

12. The method according to claim 1, wherein the inorganic, electroconductive adhesive comprises particle having an average particle size in the range from 1 to 100 nm.

13. The method according to claim 12, wherein
    when the porous electrode is positive, the particles of the inorganic, electroconductive adhesive comprise at least one selected from the group of particles of active mass for electrodes consisting of the elements Co, Ni, Mn, V, Fe and P, and
    when the porous electrode is negative, the particles of the inorganic, electroconductive adhesive comprise at least one selected from the group of the elements consisting of C, Si, Nb, Ti, Mo and W, or from particles of compounds selected from the group consisting of titanium suboxide, titanium nitride, titanium carbide, doped or undoped tin oxide, indium-tin oxide (ITO) and doped or undoped zinc oxide.

14. The method according to claim 1, wherein the assembly is bendable down to a radius down to 1 cm without damage.

* * * * *